United States Patent [19]

Beraldin et al.

[11] Patent Number: 4,967,066

[45] Date of Patent: Oct. 30, 1990

[54] METHOD AND SYSTEM FOR INCREASING THE EFFECTIVE DYNAMIC RANGE OF A PHOTOSENSOR

[75] Inventors: J. Angelo Beraldin, Ottawa; Francois Blais, Orleans, both of Canada

[73] Assignee: National Research Council Canada/Conseil National De Recherches Canada, Ottawa, Canada

[21] Appl. No.: 417,492

[22] Filed: Oct. 5, 1989

[30] Foreign Application Priority Data

Oct. 19, 1988 [CA] Canada .................................. 580652

[51] Int. Cl.⁵ .............................................. G01J 1/32
[52] U.S. Cl. ................................ 250/205; 250/214 R
[58] Field of Search .......................... 250/205, 214 R; 315/152, 156, 157, 158

[56] References Cited

U.S. PATENT DOCUMENTS

| | | | |
|---|---|---|---|
| 4,266,123 | 5/1981 | Friberg | 250/205 |
| 4,443,695 | 4/1984 | Kitamura | 250/205 |
| 4,555,621 | 11/1985 | Buchar | 250/205 |
| 4,642,451 | 2/1987 | Tsunekawa et al. | |
| 4,643,571 | 2/1987 | Ferber et al. | 250/205 |
| 4,658,368 | 4/1987 | Blais | |
| 4,677,287 | 6/1987 | Ejima | 250/205 |
| 4,687,920 | 8/1987 | van der Linden | |
| 4,725,723 | 2/1988 | Shimojima | 250/205 |

OTHER PUBLICATIONS

"Practical Considerations for a Design of a High Precision 3-D Laser Scanner System" by Francois Blais et al.-published in Optomechanical and Electro-Optical Design of Industrial Systems, SPIE Proceedings 1988, "Real-Time Numerical Peak Detector" by Francois Blais et al., published in Signal Process, 11(2), 1986, pp. 145-155, or in F. Blais, U.S. Pat. No. 4,658,368 Issued Apr. 14, 1987.

*Primary Examiner*—David C. Nelms
*Assistant Examiner*—Que Tan Le

[57] ABSTRACT

In active range finder apparatus wherein an object to be inspected is illuminated by a laser source and light reflected by the object is detected in an imaging photosensor, a system is provided for increasing the dynamic range of the apparatus. This system provides for integrating over each of a series of measuring time periods light reflected from a window of the photosensor and hence proportional to the light received by such photosensor. When such integrated light exceeds a predetermined amount, a saturation signal is generated that immediately de-energizes the source. If this amount is not reached by the end of each period, the system is reset. The source is gradually re-energized at the commencement of each subsequent period. The virtually instantaneous de-energization and gradual re-energization combined with use of a saturation detector separate from the main photosensor ensures rapid action that is quick enough to substantially avoid saturation of such main photosensor.

7 Claims, 2 Drawing Sheets

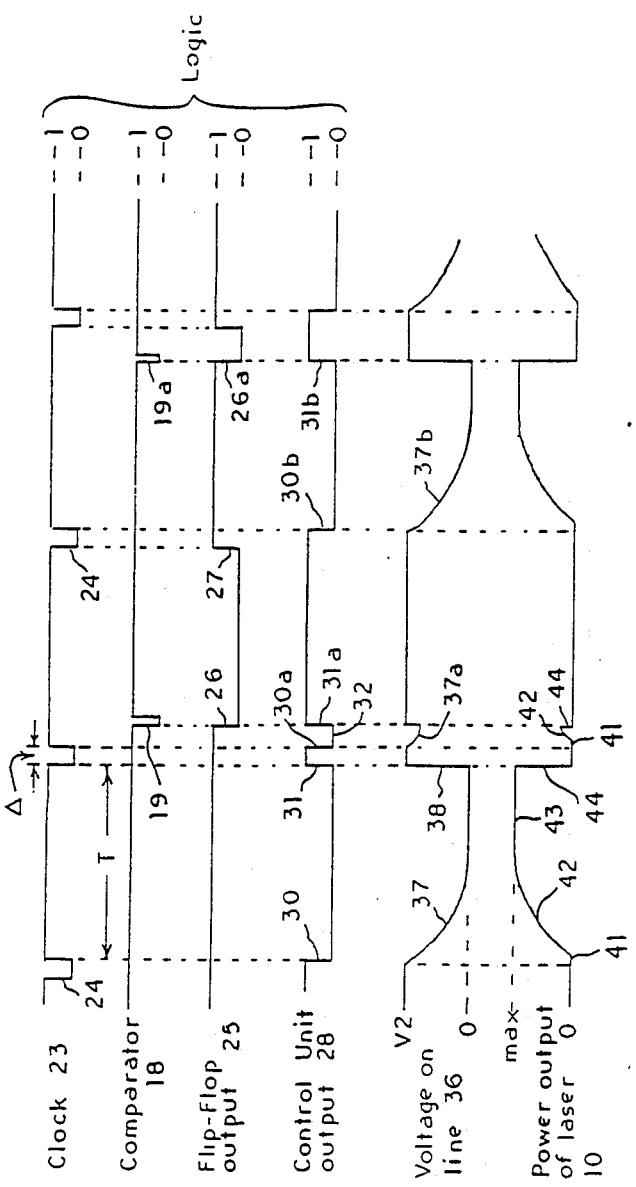

METHOD AND SYSTEM FOR INCREASING THE EFFECTIVE DYNAMIC RANGE OF A PHOTOSENSOR

FIELD OF THE INVENTION

This invention relates to a method and a system for increasing the dynamic range of apparatus such as active range finders wherein an object to be inspected is illuminated by a light source (usually a laser) and light reflected by the object is detected in an imaging or other photosensor, e.g. a linear or a bidimensional array of photodetectors (photodiodes or MOS-type detectors), to provide 3-D information about the object.

BACKGROUND OF THE INVENTION

Active range finders based on triangulation have proven to be very useful when dense depth maps are required. Applications such as robotics systems, adaptive welding, marine propeller blade measurement, and the measurement and reproduction of objects in three dimensions have benefitted from the technique. See "Practical Considerations for a Design of a High Precision 3-D Laser Scanner System" by F. Blais et al published in Optomechanical and Electro-Optical Design of Industrial Systems, SPIE Proceedings, 1988.

Most high precision range finders use a solid state line scanner arranged as a linear array of photodetectors. To measure the position of the reflected spot, the pixels in the array are scanned sequentially at a clock speed ranging from 2 to 20 MHz. High depth resolutions can be achieved by feeding the output of the array into a numerical peak detection circuit.

Area sensors, which include imaging tubes and solid state arrays are the most common imaging devices and can be purchased in large volume. The most common types of solid state imaging sensors used in robotics are the video format CCD or CID bidimensional imaging devices having something of the order of 450×480 pixels. Such sensors typically have a dynamic range of $10^3$.

Linear solid state sensors (CCD, CID) and photodiode arrays are similar in characteristics to the previous devices. They are used with single point range sensors and provide high performance position detection. These sensors typically have a dynamic range of $5 \times 10^3$.

Point detectors such as lateral effect photodiodes are used mainly for very fast single point 3-D range sensors. The dynamic range of a lateral effect photodiode is typically $10^4$.

All these position sensitive detectors require external electronic circuits to evaluate the position of the spot produced by the incident laser beam. The resulting dynamic range of the whole system is usually limited to about $10^2$ because of the limitations of the analog-to-digital converters.

Among the photodetectors available commercially, the most important ones are the photodiode, the avalanche photodiode, and the photomultiplier tube. The last two are used mainly to detect very weak signals. For laser intensity control, a photodiode is sufficient for most applications, because the control system should respond to light intensities above the saturation level of the position sensor. Weak signals are taken care of by the dynamic range of the position sensor. The dynamic range is typically $10^4$.

A practical limitation of all these sensors is their relatively low saturation level. Once the saturation exposure (saturation charge) has been reached over many pixels, the accuracy drops to an unacceptable level. For example, if the object being inspected is a polished metal surface (as often found on printed circuit boards), such a surface can reflect a projected laser beam almost completely to the sensor, if the surface is oriented within the viewing angle of the sensor. On the other hand, if the orientation of the surface falls outside the viewing angle, only the small scattering lobe of light will be received. This results in a very wide dynamic range of received intensities, typically $10^5$ to $10^6$, whereas, as explained above practical photodetector arrays usually only have a dynamic range of $10^2$ to $10^3$, or at the most $10^4$.

SUMMARY OF THE INVENTION

The object of the present invention is to provide a method for increasing the effective dynamic range of such apparatus by avoiding saturation of the photosensor.

To this end, the invention consists of a method of increasing the effective dynamic range of a photosensor that receives light reflected from a source by an object, comprising (a) integrating light proportional to such light received by the photosensor over each of a series of measuring time periods, (b) generating a saturation signal when the level of such integrated light reaches a predetermined value, (c) de-energising the source upon generation of such a saturation signal or upon termination of a said period whichever occurs first, and (d) gradually re-energising the source at the commencement of each subsequent said period.

The invention also relates to a system for carrying out such a method.

More specifically, the invention provides a system for use in apparatus having a source of light for illuminating an object and a photosensor for detecting light reflected by such object; said system being for increasing the effective dynamic range of said photosensor and comprising (a) a saturation detector mounted to receive an amount of light proportional to the light received by the photosensor for generating a saturation signal when the integral of said amount of light over each of a series of measuring time periods has reached a predetermined value, (b) means for de-energising the source and resetting the saturation detector upon the occurrence of whichever is the earlier of termination of a said period and receipt of such a saturation signal, and (c) means for re-energising the source at the commencement of a subsequent time period in a manner to gradually increase the intensity of the light emitted by the source.

It is known from U.S. Pat. No. 4,687,920 issued Aug. 18, 1987 to B. G. van der Linden and U.S. Pat. No. 4,642,451 issued Feb. 10, 1987 to T. Tsunekawa et al to measure the intensity level of received light and adjust the emitted light power so that the received power is maintained at a predefined level.

In contrast to these prior proposals, in the present invention the light received in the saturation detector is integrated over a fixed time interval or until a voltage proportional to the integrated amount of light has become equal a predetermined voltage, whereupon the source is virtually instantaneously completely de-energised. This avoids the laser, which is usually used as the light source, from operating continuously in the region below threshold.

Moreover, while the prior proposals use the main photosensor as the saturation detector, the present invention uses a separate saturation detector, thus anticipating and avoiding saturation of the main photosensor. This arrangement, combined with the complete de-energisation of the source (in contrast to merely lowering its power output) when the value of the integrated light reaches a predetermined level, ensures the very fast action necessary to avoid saturation of the main photosensor.

BRIEF DESCRIPTION OF THE DRAWINGS

FIG. 2 is a waveform diagram illustrating the function of the system of FIG. 1.

DETAILED DESCRIPTION OF PREFERRED EMBODIMENT

Figure 1:
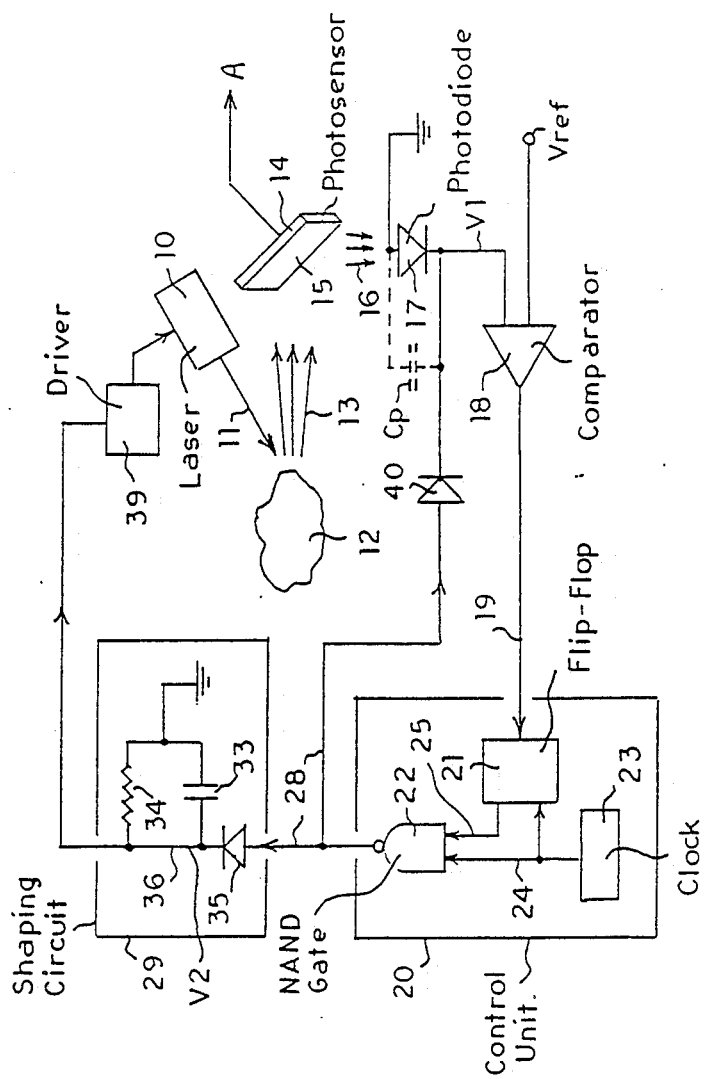
FIG. 1 is a circuit diagram of a preferred embodiment of the invention.

A laser diode 10 and associated apparatus provides a scanned beam 11 to illuminate an object 12. Reflected light 13 focused by a lens system (not shown) is directed onto an imaging photosensor 14 consisting of an array of photoelements (not shown) that generate signals A for passing to a peak detector or other device (not shown), e.g. a peak detector such as described in "Real-Time Numerical Peak Detector," by F. Blais et al., published in Signal Process, 11(2), 1986, pp. 145–155, or in F. Blais U.S. Pat. No. 4,658,368 issued Apr. 14, 1987.

The array 14 will have a front window 15 through which the light 13 passes to the photoelements, and inevitably a small amount of this light 13 will be reflected by the window 15 as light 16. The intensity of this reflected light 16 is proportional to the intensity of the received light 13.

The light 16 is arranged to fall on a photodiode 17 which by means of its parasitic capacitance Cp integrates the total amount of the light 16 received over a given time period. Initially, an analog voltage V1 is applied across this capacitance Cp, the integration taking the form of discharge of this voltage by the light 16. This voltage V1 is compared in a comparator 18 with a reference voltage Vref. The decrease in voltage will normally be large enough, e.g. in the tens of millivolts, for the parasitic capacitance Cp to be sufficient. When V1 becomes equal to Vref, indicating saturation of the photosensor 14, the comparator emits a digital signal 19 (logic 0), as shown in FIG. 2. The parts 17 and 18 thus constitute a saturation detector.

This signal 19 is passed to a control unit 20 that consists of a flip-flop 21, a NAND gate 22 and a clock 23. As shown in FIG. 2, the clock output is at logic 1 for a measuring time period T (typically about 50 μs), while emitting a short logic 0 signal 24 for a much shorter period Δ.

Receipt by the flip-flop 21 of a saturation signal 19 from the comparator 18 will change the output 25 of the flip-flop from logic 1 to logic 0, as shown at 26 in FIG. 2. As shown at 27, this output 25 is reset to logic 1 by the leading edge of the next clock pulse 24, i.e. at the end of the next measuring time period T. The output 28 of the NAND gate 22 and hence of the control unit 20 is made logic 0, as shown at 30, by the trailing edge of a clock pulse 24, i.e. at the beginning of a measuring time period T, and such output 28 remains this way until it receives the leading edge of the next clock pulse 24, as shown at 31, when it becomes logic 1 again. It is returned to logic 0 again at 30a by the trailing edge of the next clock pulse, and would remain this way for a measuring period T if it were not for reversal of the flip-flop 21 at 26 by the saturation signal 19. This reversal returns the output 28 to logic 1 at 31a, where it remains until the clock pulse trailing edge brings it back to logic 0 at 30b.

While in the second cycle illustrated in FIG. 2 the saturation signal 19 has been assumed to arrive early in a period T, so that the length of the logic 0 portion 32 is short, in the third cycle illustrated it has been assumed that a saturation signal 19a arrives towards the end of a period. The effect is basically the same, with the signal 19a reversing the flip-flop at 26a and hence switching the output 28 at 31b.

A shaping circuit 29 which receives the output 28 contains a capacitor 33 and a resistor 34 connected in parallel. The output 28 is supplied to this circuit through a diode 35. When such output goes to logic 0 at point 30, the voltage V2 on line 36 is discharged to ground relatively gradually with a time constant of RC, where R is the resistance of the resistor 34 and C is the capacitance of the capacitor 33. This discharge is shown at 37 in FIG. 2. On the other hand, when the output 28 goes back to logic 1, i.e. supplies the voltage V2 to the shaping circuit 29, say at point 31, the voltage V2 is reestablished on line 36 very rapidly, i.e. with a time constant R'C, where R' is the resistance of the diode 35. This change is virtually instantaneous and is shown at 38 in FIG. 2, and hence lines 37 and 38 together illustrate the voltage waveform on line 36 and hence the waveform supplied by the shaping circuit to a conventional laser driver 39 that drives the laser diode 10. The waveform 37, 38 assumes that no saturation signal is received before the leading edge of the clock pulse 24.

When a saturation signal 19 or 19a is received before the end of a clock cycle, this voltage waveform is interrupted, the discharge portions being shortened, as shown at 37a and 37b.

The output 28 of the control unit 20 is also supplied through a diode 40 to the photodiode 17 to charge the parasitic capacitance Cp to the voltage V1 and hence reset the saturation detector, this happening at points 31, 31a and 31b. Hence the photodiode 17 is reset after each saturation signal 19, or, if no saturation signal is generated, at the leading edge of each clock pulse.

FIG. 2 also shows the power output of the laser diode 10 as produced by the voltage waveform 37, 38. Initially there is a very short period (typically about 0.1 μs) of non-lasing LED output 41, followed by a rise 42 in output power, and eventually a steady output 43. For ease of illustration FIG. 2 is not to scale. Typically the rise 42 will occupy about 3 to 4 μs, so that the steady output 43 will occupy most of the 50 μs of a cycle. At the increasing voltage waveform 38, the laser 10 is turned off very rapidly (typically 0.03 μs) at 44.

While the apparatus has been shown as having a laser source, since this will be the most likely source to be used in practice since a laser gives the maximum depth of focus for a given wavelength (usually in the near infrared or visible red regions), the invention is applicable to use with a source of non-coherent light, e.g. an LED. The advantages of speed and increased dynamic range will still be obtained.

With the exception of the voltages V1 and V2 which are analog, the circuit is entirely digital in function. This fact, combined with the small number of steps involved, also contributes to the high response time.

This apparatus employs a combination of a photodiode working as an integrator to directly generate an estimate of the exposure level on the array of photoelements, with the use of a very simple timing scheme and a shaped input excitation that drives the laser diode. This system can eliminate the problem of saturation in vision systems based on sensor arrays.

The slow rise time 42 of the laser power increases the dynamic range of the apparatus without sacrificing the total available exposure, i.e. the maximum laser power times T. The efficiency is typically 95% of that total exposure. The rest of the dynamic range is gained through fast detection of the exposure level, fast comparison to the saturation exposure of the sensor array, and fast turn off of the laser diode at 44.

We claim:

1. A method of increasing the effective dynamic range of a photosensor that receives light reflected from a source by an object, comprising
   (a) integrating light proportional to such light received by the photosensor over each of a series of measuring time periods,
   (b) generating a saturation signal when the level of such integrated light reaches a predetermined value,
   (c) de-energising the source upon generation of such a saturation signal or upon termination of a said period whichever occurs first, and
   (d) gradually re-energising the source at the commencement of each subsequent said period.

2. A system for use in apparatus having a source of light for illuminating an object and a photosensor for detecting light reflected by such object; said system being for increasing the effective dynamic range of said photosensor and comprising
   (a) a saturation detector mounted to receive an amount of light proportional to the light received by the photosensor for generating a saturation signal when the integral of said amount of light over each of a series of measuring time periods has reached a predetermined value,
   (b) means for de-energising said source and resetting said saturation detector upon the occurrence of whichever is the earlier of termination of a said period and receipt of such a saturation signal, and
   (c) means for re-energising the source at the commencement of a subsequent said time period in a manner to gradually increase the intensity of the light emitted by said source.

3. A system according to claim 2, wherein the source is a laser.

4. A system according to claim 3, wherein the photosensor has a window through which the light reflected by the object enters the photosensor, said saturation detector being mounted to receive light reflected by said window.

5. A system according to claim 4, wherein said saturation detector comprises a photodiode having a capacitance across it, and a comparator for generating a said saturation signal when a voltage across said capacitance becomes equal to a predetermined value.

6. A system according to claim 5, wherein said de-energising means comprises a control unit for receiving said saturation signal from the comparator and a clock for defining the commencement and termination of each said period.

7. A system according to claim 6, wherein said means for re-energising the source comprises a first circuit with a very short time constant for passing a de-energising signal from the de-energising means virtually instantaneously to the source, and a second circuit with a longer time constant for generating a gradually rising reenergisation signal and passing the same to the source.

* * * * *